US010255067B2

(12) United States Patent
Noens

(10) Patent No.: US 10,255,067 B2
(45) Date of Patent: Apr. 9, 2019

(54) DEVELOPMENT OF INTERNET OF THINGS (IOT) APPLICATIONS

(71) Applicant: SAP SE, Walldorf (DE)

(72) Inventor: Ludo Franciscus Maria Noens, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/359,588

(22) Filed: Nov. 22, 2016

(65) Prior Publication Data

US 2018/0143825 A1 May 24, 2018

(51) Int. Cl.
| | |
|---|---|
| G06F 9/44 | (2018.01) |
| G06F 8/77 | (2018.01) |
| H04L 29/08 | (2006.01) |
| G06F 8/30 | (2018.01) |
| H04W 4/70 | (2018.01) |
| G06F 8/60 | (2018.01) |

(52) U.S. Cl.
CPC ............... *G06F 8/77* (2013.01); *G06F 8/30* (2013.01); *G06F 8/60* (2013.01); *H04L 67/34* (2013.01); *H04W 4/70* (2018.02)

(58) Field of Classification Search
None
See application file for complete search history.

(56) References Cited

U.S. PATENT DOCUMENTS

| | | | | |
|---|---|---|---|---|
| 2008/0127041 A1* | 5/2008 | Gura | .................... | G06Q 10/06 717/101 |
| 2009/0113445 A1* | 4/2009 | Sakashita | ............ | G06F 17/2827 719/313 |
| 2010/0023920 A1* | 1/2010 | Chaar | ...................... | G06F 8/10 717/102 |
| 2013/0318498 A1* | 11/2013 | Mittal | .................. | G06F 11/366 717/124 |
| 2013/0326487 A1* | 12/2013 | Yousouf | ................. | G06F 9/455 717/134 |
| 2014/0351790 A1* | 11/2014 | Ghose | ...................... | G06F 8/70 717/120 |

(Continued)

FOREIGN PATENT DOCUMENTS

CN 104240131 A 12/2014

OTHER PUBLICATIONS

Yunge et al.,"Hybrid Apps: Apps for the Internet of Things," 2015 IEEE.*
Jose Danado and Fabio Paterno, A Mobile End-User Development Environment for IoT Applications Exploiting the Puzzle Metaphor, ERCIM News 101, retrieved on Jan. 19, 2016, pp. 1-2, CNR-ISTI, Italy.

(Continued)

*Primary Examiner* — Insun Kang
(74) *Attorney, Agent, or Firm* — Jones Day

(57) ABSTRACT

Described herein is a framework for developing Internet of Things (IoT) applications. In accordance with one aspect, the framework retrieves metadata and at least one predefined project template. Source code for different Internet of Things (IoT) applications is generated via an integrated development environment (IDE) based on the project metadata and the project template. The framework receives configuration data associated with the IoT applications and associated IoT targets. In response to a single user input received via the IDE, the IoT applications are deployed to the IoT targets substantially and simultaneously, based on the configuration data.

19 Claims, 6 Drawing Sheets

(56) References Cited

U.S. PATENT DOCUMENTS

| | | | | |
|---|---|---|---|---|
| 2014/0366015 | A1* | 12/2014 | Dobson | G06F 8/60 717/177 |
| 2015/0046905 | A1* | 2/2015 | Kumar | G06F 8/71 717/122 |
| 2015/0268949 | A1* | 9/2015 | Huber | G06F 17/3089 717/120 |
| 2016/0065653 | A1* | 3/2016 | Chen | H04L 67/10 715/735 |
| 2016/0088049 | A1* | 3/2016 | Seed | G06F 9/541 709/203 |
| 2016/0147506 | A1* | 5/2016 | Britt | G06F 8/36 717/107 |
| 2016/0224335 | A1* | 8/2016 | Zhou | G06F 8/76 |
| 2017/0116056 | A1* | 4/2017 | Nelaturu | G06F 9/52 |
| 2017/0235585 | A1* | 8/2017 | Gupta | G06F 9/45558 718/1 |
| 2017/0237814 | A1* | 8/2017 | Zhang | H04L 67/12 709/201 |

OTHER PUBLICATIONS

ContractIQ, Building the Internet of Things—The Open Source Master Plan, App Development Outsourcing, retrieved on Jan. 19, 2016, pp. 1-7, ContractIQ.

Embarcadero Technologies, Developing Connected Apps for the Internet of Things (IoT) Just Got Easier With Appmethod, Sep. 8, 2014, pp. 1-2, Marketwired L.P., San Francisco, CA.

Kony Inc., Kony Studio: Mobile App Development Built for the Enterprise, IDE Software, Cross Platform Development Tools, retrieved on Jan. 19, 2016, pp. 1-16, Kony Inc.

Stephen S. Yau and Arun Balaji Buduru, Intelligent Planning for Developing Mobile IoT Applications Using Cloud Systems, 2014 IEEE International Conference on Mobile Services, 2014, pp. 55-62, IEEE Computer Society, Tempe, AZ.

Pieter Hermans, Easy, Fast and Fun to Create Mobile Applications for the Internet of Things, Sensor Networks Conference, retrieved on Jan. 19, 2016, pp. 1-2, Jakajima.

* cited by examiner

US 10,255,067 B2

DEVELOPMENT OF INTERNET OF THINGS (IOT) APPLICATIONS

TECHNICAL FIELD

The present disclosure relates generally to computer systems, and more specifically, to a framework for application development.

BACKGROUND

The Internet of Things (IoT) is the internetworking of physical devices, vehicles, smart devices, connected devices, and/or other items that are capable of collecting and exchanging data. Developers working on IoT applications typically program a system that includes many components, such as computer system side logic, Web applications (or Apps), mobile applications (or Apps) as well as IoT device logic. Separate tools are currently used to create the application code. Dedicated development environments are typically used for deployment to the different targets and platforms. However, setting up and maintaining these development environments create a significant amount of overhead and are error-prone.

SUMMARY

A framework for developing IoT applications is provided herein. In accordance with one aspect, the framework retrieves metadata and at least one predefined project template. Source code for different Internet of Things (IoT) applications is generated via an integrated development environment (IDE) based on the project metadata and the project template. The framework receives configuration data associated with the applications and associated IoT targets. In response to a single user input received via the IDE, the applications are deployed to the IoT targets substantially and simultaneously, based on the configuration data.

BRIEF DESCRIPTION OF THE DRAWINGS

Some embodiments are illustrated in the accompanying figures, in which like reference numerals designate like parts, and wherein.

DETAILED DESCRIPTION

Figure 1:
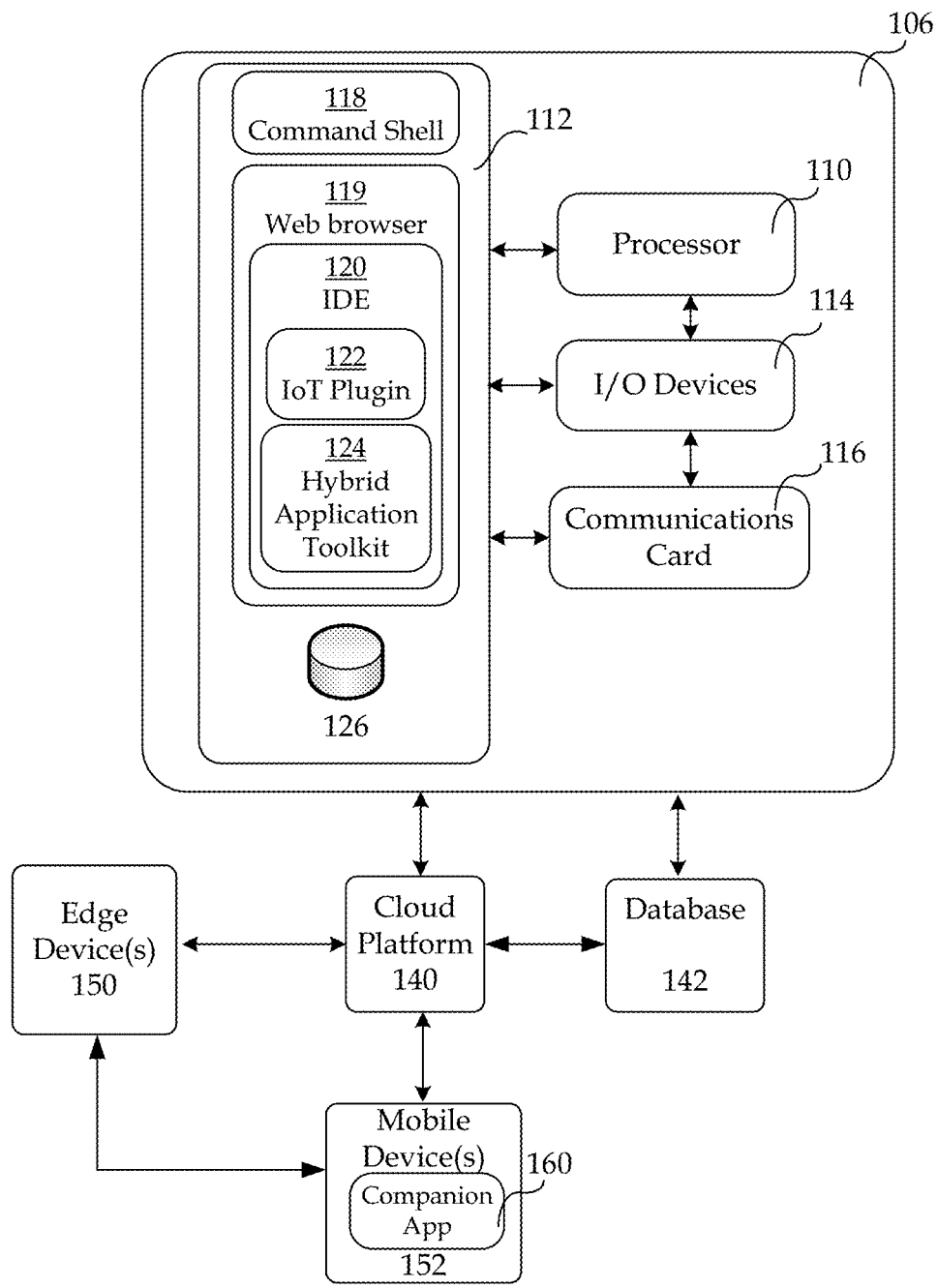
FIG. 1 is a block diagram illustrating an exemplary architecture.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A developer of IoT applications or services typically integrates the IoT devices with an integration platform, such as SAP HANA cloud platform. Data collected from the IoT devices may be stored in, for example, a HANA database. Development, configuration and integration efforts can be significant, particularly when the application programming interfaces (APIs) are not clearly defined, as they are most likely generated by third parties and partners.

The developer typically interacts with IoT devices that interface with sensors, actuators, etc. Since most IoT devices have no or limited user interface, it is useful to create a user interface on a mobile device (e.g., a smartphone). Developing a mobile application to monitor, control and test the IoT device poses similar integration challenges with respect to APIs and configuration as those encountered in platform integration.

An end-user (e.g., a service technician) may control and interact with the IoT devices by using a mobile application that provides the user interface for this particular IoT device. For example, a SAP UI5 based App may be used to monitor the status of the IoT device and change configuration settings.

Changes to application code running on the IoT device platform may require changes in the code of the Web applications or mobile applications, services, computer system side logic and storage, and vice versa. Typically, the developer maintaining the code developed for the various platforms has to manually keep the code synchronized. Besides the application code, the configuration of the IoT cloud platform is also a factor that makes alignments more difficult. Mismatches in configuration and code result in solutions that do not work and require a significant amount of time to debug.

The IoT device may stream data to the cloud platform, where a streaming service (e.g., SAP HANA Smart Data Streaming) processes this data, triggers events and stores the data in an in-memory database. Another option is to store all collected data in an embedded Structured Query Language (SQL) Anywhere database management system that periodically gets synchronized with the database.

To avoid bandwidth costs related to collecting large amounts of data on the IoT edge and sending that data over to the services for further processing, the edge devices can be made smarter to assist in preprocessing data. For this type of system optimization, part of the computing should be moved from the cloud to the edge. In the industry, this is called "fogging" (as in the cloud goes lower). The edge becomes more sophisticated.

A framework for developing and deploying IoT applications (or services) is described herein. Developing an IoT system involves application development on the computer system, on mobile devices, and/or edge IoT devices. The present framework combines the code (e.g., JavaScript™) for embedded IoT applications with the Web applications and mobile applications code into a single project in a single integrated development environment (IDE). By combining all relevant metadata into a single project, the developer may generate code (e.g., application code, API code, micro or service code) to create a complete solution, including but not limited to, mobile applications that are able to interact with IoT devices, Web applications that interact with IoT devices, Web applications that provide a dashboard overview, corresponding configuration data and application code that run on an IoT device itself, configuration data and code related to the streaming service on the database, XS engine control logic from programming the data services, and/or logic for exposing data via APIs (e.g., Open Data Protocol (OData) or Representational State Transfer (REST)).

The framework may also provide a "one click deployment" function (e.g., via a user interface button or menu item) within the IDE to deploy the IoT device code to one or more IoT devices, computer system side logic to services, configuration data to the IoT cloud platform and corresponding Web/mobile applications at substantially the same time. In some implementations, the IDE is implemented as a Web browser plugin, and provides the functionality of deploying to a cloud platform. Since all relevant metadata is captured within a single project structure, the code is advantageously synchronized across the various platforms involved without manual intervention from the developer (or end user). The IoT cloud platform is also automatically configured correctly and kept up-to-date with any changes.

In some implementations, the IDE combines one or more of the following components in a single environment: (1) IoT device/gateway programming; (2) Web and/or mobile application development; (3) user interface configuration; (4) event streaming service; and (5) database configuration. The user interface, streaming service and/or database may be automatically configured via APIs. The risk of going out of synchronization on one of these components is significantly reduced, and development is thereby significantly simplified and productivity is advantageously increased. By making use of a cloud-based solution, the time and effort in installing and managing various tools may further be reduced.

It should be appreciated that the terms "applications", "Apps" and "services" may be used interchangeably herein. It should also be appreciated that the framework described herein may be implemented as a method, a computer-controlled apparatus, a computer process, a computing system, or as an article of manufacture such as a computer-usable medium. These and various other features and advantages will be apparent from the following description.

FIG. 1 is a block diagram illustrating an exemplary architecture 100 in accordance with one aspect of the present framework. Generally, exemplary architecture 100 may include a computer system 106, a cloud platform 140, a database 142, one or more edge devices 150 and one or more mobile devices 152.

Computer system 106 may include a processor (or processor device) 110, input/output (I/O) devices 114 (e.g., touch screen, keypad, touch pad, display screen, speaker, etc.), a memory module 112, and a communications card or device 116 (e.g., modem and/or network adapter) for exchanging data with a network (e.g., local area network (LAN), wide area network (WAN), Internet, etc.). It should be appreciated that the different components and sub-components of the computer system 106 may be located or executed on different machines or systems. For example, a component may be executed on many computer systems connected via the network at the same time (i.e., cloud computing).

Memory module 112 may be any forms of non-transitory computer-readable media, including, but not limited to, dynamic random access memory (DRAM), static random access memory (SRAM), erasable programmable read-only memory (EPROM), electrically erasable programmable read-only memory (EEPROM), flash memory devices, magnetic disks, internal hard disks, removable disks or cards, magneto-optical disks, compact disc read-only memory (CD-ROM), any other volatile or non-volatile memory, or a combination thereof. Memory module 112 serves to store machine-executable instructions, data, and various software components for implementing the techniques described herein, all of which may be processed by processor 110. As such, computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java™, JavaScript, Advanced Business Application Programming (ABAP.TM.) from SAP.RTM. AG; Structured Query Language (SQL), etc.), or in assembly of machine language if desired. The language may be a compiled or an interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes a command shell 118, a web browser 119, an integrated development environment (IDE) 120 and a database 126. IDE 120 provides a single entry point for developing applications. IDE 120 may be extended with one or more optional plugins (122, 124). In some implementations, IDE 120 includes an IoT plugin 122 and a Hybrid Application Toolkit 124. An IoT project may be set up via the IDE 120 as a Multi Target Application (MTA).

Hybrid Application Toolkit 124 may communicate with a companion application (or App) 160 that runs on mobile devices 152, and is able to run a mobile Web application in a container, thereby providing access to native mobile application programming interfaces (APIs). These native APIs may be used to access mobile device functionalities (e.g., camera, touchscreen, microphone) and interact with other devices over a network (e.g., WIFI, Bluetooth). The Companion App 160 enables the developer to rapidly develop an application that can interact with one or more IoT devices and/or IoT gateways. The Hybrid Application Toolkit 124 may further support a connector (not shown). The connector may serve to bridge the gap between the Web-based development environment 120 provided via the Web browser 119 and the locally installed development tools accessed via command shell 118. In some implementations, the connector is a server capable of spawning local processes. The connector enables the building of mobile Apps on the computer system 106 and it can also be used to interact with the database 142 via the console client.

Computer system 106 may operate in a networked environment using logical connections to a cloud platform 140 and a database 142. Cloud platform 140 is the integration platform that is a deployment target for Web applications. Cloud platform 140 also hosts several services that may be consumed by applications that are created in the IoT project. Relevant services include, but are not limited to, mobile services, IoT services, authentication services, and so forth. Database 142 may include a real-time in-memory database (e.g., SAP HANA), application services, database services and integration services. Database 142 may store, process and expose IoT data via a data protocol such as, for example, Open Data Protocol (OData).

Cloud platform 140 communicates with edge devices 150 and mobile devices 152. Edge devices 150 include one or more IoT devices and/or gateways, sensors and actuators. Mobile devices 152 may be mobile phones, tablets, laptops, and/or any other mobile computing devices that can easily be physically moved to connect with IoT devices out in the field. Mobile devices 152 may communicate with edge devices 150 over a wired or wireless network, such as WIFI or Bluetooth.

Figure 2:
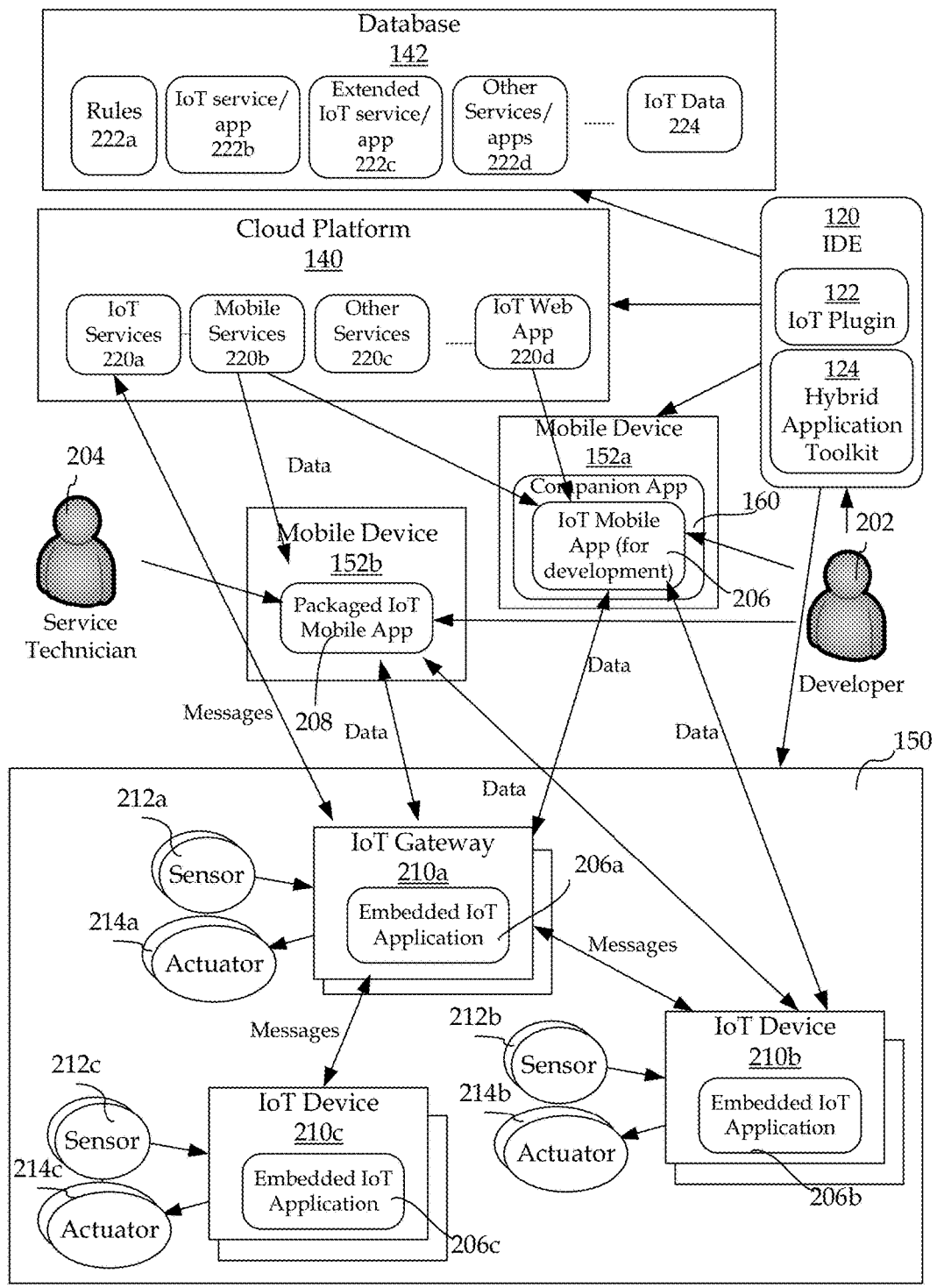
FIG. 2 shows a more detailed exemplary architecture.

FIG. 2 shows a more detailed exemplary architecture 200. It should be noted that in the following discussion, reference will be made, using like numerals, to the features described in FIG. 1.

Developer 202 may use mobile device 152a to run the companion application 160. The companion application 160 enables the developer 202 to preview, run and/or test the IoT mobile application (or App) 206, which provides the user interface (UI) for accessing or controlling the embedded IoT applications 206a-c running on the IoT devices or gateways 210a-c. The IoT mobile App 206 is a hybrid mobile application developed in IDE 120, and can also be deployed to a Web server (e.g., cloud platform 140) or a front-end server (e.g., Advanced Business Application Programming (ABAP) or ABAP front-end server). The advantage of running the IoT mobile App 206 within the companion App 160 is that it enables access to native APIs in the mobile device 152a, without requiring a time-consuming build process. The App 206 can access data available in the back-end system over, for example, OData or REST interfaces provided by the services on the cloud platform 140. Such back-end system may be a service or database 142 that the user interacts with via a front-end system. The back-end system provides the data access layer and may be running on a server.

Service technician 204 may use another mobile device 152b for installing or troubleshooting IoT devices 210a-c via a packaged IoT mobile application (or App) 208. The packaged App 208 may be downloaded and installed via a distribution channel (e.g., a mobile application store such as SAP Mobile Place). The packaged App 208 is a hybrid mobile application developed in IDE 120. The functionality of this App 208 may be the same or similar to that of the IoT mobile App 206 or another more advanced application targeting specific users (e.g., service technicians). The App 208 may access data available in the back-end system over, for example, OData or REST interfaces provided via the cloud platform 140. In some implementations, the packaged App 208 offers offline data storage. While the mobile device 152b is not connected to a network, the user 204 may still view, store and/or manage data on the device 152b. The offline data may be synced with the back-end system at a later time when the connectivity is restored.

Cloud platform 140 provides various services (e.g., IoT services 220a, mobile services 220b, other services 220c) and applications (e.g., IoT Web App 220d). IoT services 220a facilitate the management of connected IoT devices 210a-c and secure exchange of messages over, for example, hypertext transfer protocol (HTTP). Messages may contain sensor data from sensors 212a-c and/or control data for actuators 214a-c. Sensor data collected by the IoT services 220a may be stored as IoT data 224 in database 142. Control data is sent to the IoT devices 210b-c or gateway 210a for routing. Other service 220c may include predictive services, document service, portal, Mobilink, cloud integration, security, gamification and so forth.

IoT Web App 220d is an application hosted online on the cloud platform 140 (or other server) and may be consumed via various Web browsers available on a variety of devices (e.g., mobile device 152). IoT Web App 220d may also consume services 220a-c. IoT Web App 220d may be used for status monitoring, management and/or control. IoT Web App 220d may implement a dashboard where information from various data sources is combined. Web App 220d may make use of various services available on cloud platform 140 and database 142.

Database 142 stores IoT data 224 in, for example, tables. IoT data 224 may include sensor data, status information, timestamps, etc. Database 142 may further provide rules 222a, IoT service (or App) 222b, extended IoT service (or App) (e.g., node.js) 222c, as well as other services (or Apps) 222d. IoT service 222b may be implemented as a Server-side JavaScript (XSJS) service written in native code (e.g., HANA). The IoT service 222b may implement procedural application logic, with the ability to provide OData or REST services from a table or view from database 142. IoT service 222b may have full access to the objects, body output and result set after a selection from database 142. IoT service 222b may be able to select, manipulate and expose IoT data 224 via, for example, OData APIs. IoT service 222b may be developed in, for example, JavaScript and deployed by IDE 120. Other services 222d may include predictive services, data acquisition and streaming services.

Extended IoT service 222c may be implemented as a cross-platform runtime environment, such as a Node.js-based service. Extended IoT service 222c may support more runtimes, and interpret JavaScript using, for example, Google's V8 JavaScript/Node.js engine. Extended IoT service 222c may be programmed in JavaScript, and is able to select, manipulate and/or expose IoT data 224 via, for example, OData APIs. Extended IoT service 222c may further support asynchronous calls, standard JavaScript, and a package manager for JavaScript (e.g., npm).

Cloud platform 140 and mobile devices 152a-b may communicate with IoT devices (or gateways) 210a-c via messages and/or data over a wired or wireless network. Each IoT device or gateway 210a-c is located near one or more sensors 212a-c and actuators 214a-c. An IoT device 210 b-c collects sensor data from sensors 212b-c and drives actuators 214b-c over wired and wireless connections. Some IoT devices 210b-c contain a Node.js runtime that can be programmed in JavaScript. Others may be programmed in different languages with other tools. The IoT devices 210b-c communicate with other devices over wired or wireless connections.

An IoT gateway 210a may act as an IoT device. A mobile device may also act as IoT device or gateway. Additionally, the IoT gateway 210a serves as a gateway where information or messages from other devices 210b-c is consolidated, processed and/or communicated to the back-end over connections that may not be supported by the IoT devices 210b-c. The IoT gateway 210a connects to the cloud platform 140, and routes messages from the IoT services 220a to the devices 210b-c for further processing.

Each IoT gateway or device 210a-c may include an embedded IoT application 206a-c. In some implementations, the embedded IoT application 206a-c is programmed in JavaScript. The embedded IoT application 206a-c are used to collect data from sensors 212a-c and drive actuators 214a-c. The collected data may be processed before being sent to IoT services hosted on the cloud platform 140, or to other devices that have subscribed to receive this data. Communication may be conducted over a wired or wireless network, such as WIFI and Bluetooth using standard protocols such as hypertext transfer protocol (HTTP) and machine-to-machine connectivity protocol (i.e., Message Queue Telemetry Transport (MQTT)). The embedded IoT application 206a-c may also include a simple Web server that hosts a Web application to provide an interactive UI.

Figure 3:
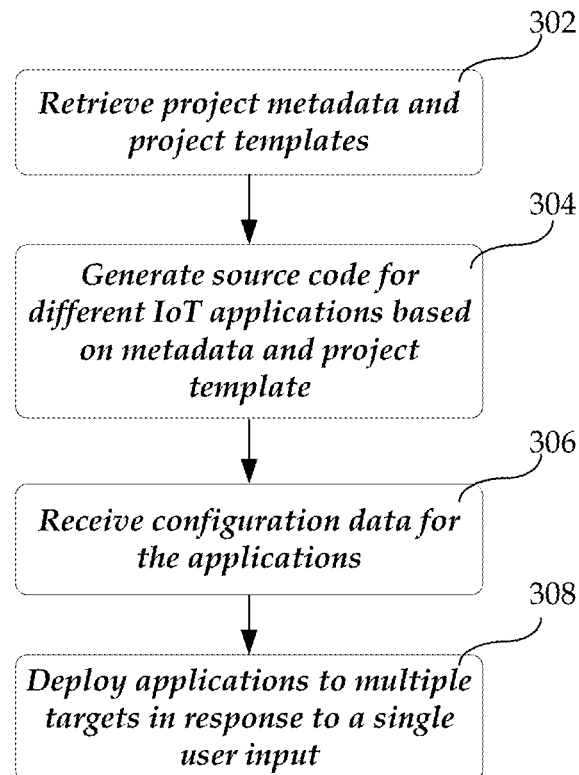
FIG. 3 shows an exemplary method 300 of developing IoT and deploying applications.

FIG. 3 shows an exemplary method 300 of developing IoT and deploying applications. The method 300 may be performed automatically or semi-automatically by the systems 100 and 200, as previously described with reference to FIGS. 1 and 2. It should be noted that in the following discussion, reference will be made, using like numerals, to the features described in FIGS. 1 and 2.

At 302, IDE 120 retrieves project metadata and one or more IoT project templates. Project metadata defines the configuration of the IoT project and may be stored as, for example, one or more JavaScript Object Notation (JSON) files in the IoT project. The IoT project may contain a number of subprojects for various different targets.

Figure 4:
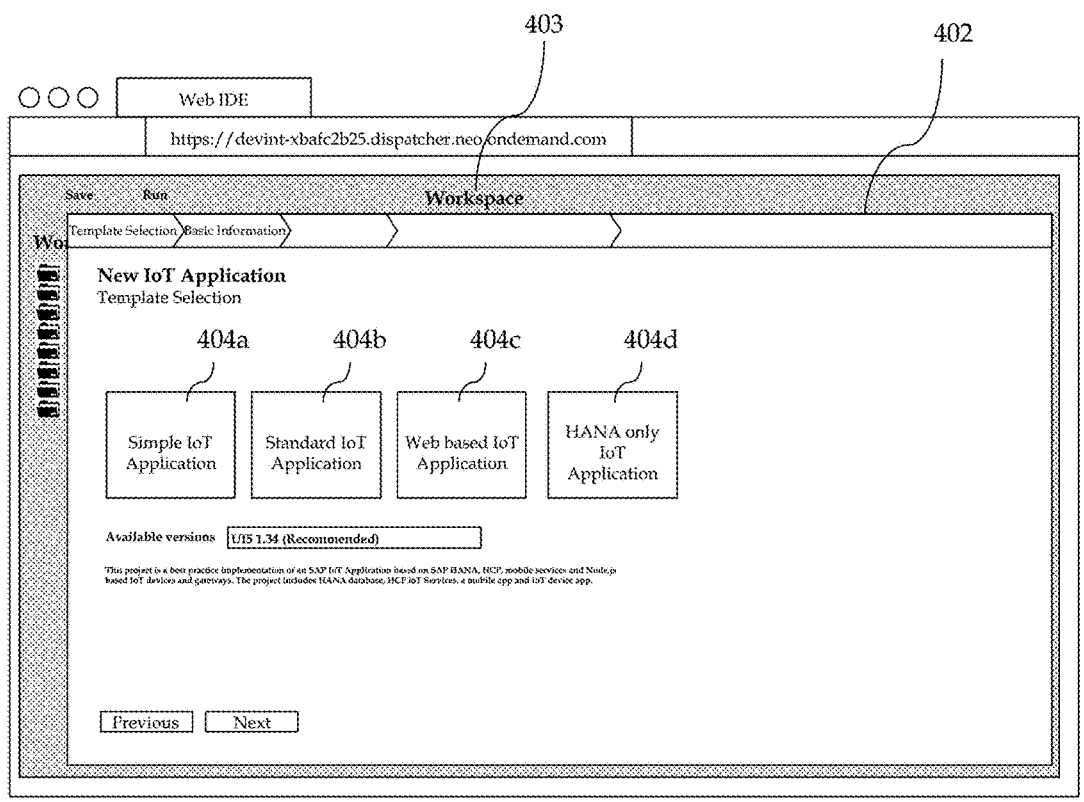
FIG. 4 shows a screenshot of an exemplary dialog box invoked via a workspace.

IDE 120 may be provided via a Web browser 119. In addition, IDE 120 may be configured to present a workspace where the user (e.g., a developer) may select one of the IoT project templates during the creation of the IoT project. FIG. 4 shows a screenshot of an exemplary dialog box 402 invoked via workspace 403. Dialog box 402 presents a project creation wizard that allows the user to select a customizable template. As shown, user-selectable tiles 404a-d representing various IoT project templates covering various implementation scenarios are presented in response to the user invoking the template selection function. The project templates may be based on predefined system architectures, and enable users to add or remove optional predefined components. The project templates may contain subprojects, code and configuration-specific data. The workspace 403 is where the project source code and configuration data are accessed. The developer is able to add additional code, configuration data and further customize the projects and subprojects.

Returning to FIG. 3, at 304, IDE 120 generates source code for different applications (or services) based on the metadata and selected project template. For the code generation, IDE 120 may use the project metadata as well as the selected project template as input. The metadata may be processed to extract information that is used during code generation and configuration of the applications. An example of the metadata is shown as follows:

```
{
    "_version": "1.0.0",
    "edge.app": {
        "version": "1.2.1",
        "id": "IntelEdison-IoTSample",
        "type": "application",
        "deviceType": "Intel Edison"
    },
    "gateway.app": {
        "version": "1.3.5",
        "id": "IntelEdison-GatewayApp",
        "type": "router",
        "deviceType": "Intel Edison"
    },
    "iotxs.svc": {
        "version": "1.2.0",
        "id": "EdisonSvc",
        "type": "service",
        "datatype": "OData",
        "settings": {
            "odataVersion": "2.0"
        }
    },
    "sap.app": {
        "version": "1.1.1",
```

-continued

```
        "id": "Mobile IoT App",
        "type": "application",
        "sourceTemplate": {
            "id": "ui5template.ApplicationProject",
            "version": "1.32.0"
        },
        "dataSources": {
            "EdisonSvc": {
                "uri": "/destinations/app.svc",
                "type": "OData",
                "settings": {
                    "annotations": [ ],
                    "odataVersion": "2.0",
                    "localUri": ""
                }
            }
        }
    },
    "data.routing": {
        ...
    }
}
```

Depending on the architecture of the IoT system and optional components used, the IoT project may contain various components. The generated source code may be stored in the IoT project's workspace file system. The source code may include JavaScript, Extensible Markup Language (XML), image, Cascading Style Sheets (CSS), HyperText Markup Language (HTML), XSJS, YAML, JSON files.

Source code may be generated for implementing the services or applications hosted on various targets, such as the front-end server, cloud platform 140, database 142, mobile devices 152a-b and/or IoT gateway or devices 210a-c. The front-end server may be used to host Web applications. The front-end server may be implemented as part of another system (e.g., ABAP system), or part of the cloud platform 140. In some implementations, source code may be generated for the IoT service 220a, mobile service 220b, other services 220c, IoT Web App 220d, IoT service 222b, extended IoT service 222c, and/or other services 222d, IoT mobile App 160, packaged IoT mobile App 208, and/or embedded IoT application 206a-c.

To generate source code for the IoT Web App 220d, the source code from the project template may be combined with the metadata to create a Web application that can run out-of-the-box. The Web application may serve as a starter application for further development. Additionally, source code for a data service (e.g., OData) hosted on the cloud platform 140 may be generated to allow for easy data consumption. Such source code exposes the data from the database services via, for example, an OData or REST interface.

Source code for IoT service 222b (e.g., XSJS service) may be generated by combining project template code with metadata and creating a data service that handles data processing on the database 142. The generated source code may be, for example, XSJS. Source code for extended IoT service 222c (e.g., Node.js service) may be generated by combining project template code with metadata and creating a data service that handles data processing on the database 142. The code generated may be, for example, standard JavaScript which runs on a Node.js runtime.

Source code for the IoT mobile App 160, packaged IoT mobile App 208 and embedded IoT application 206a-c may be generated by combining the project template code with metadata and creating code that can run on the mobile devices 152a-b and IoT gateway 210a or devices 210b-c.

Figure 5:
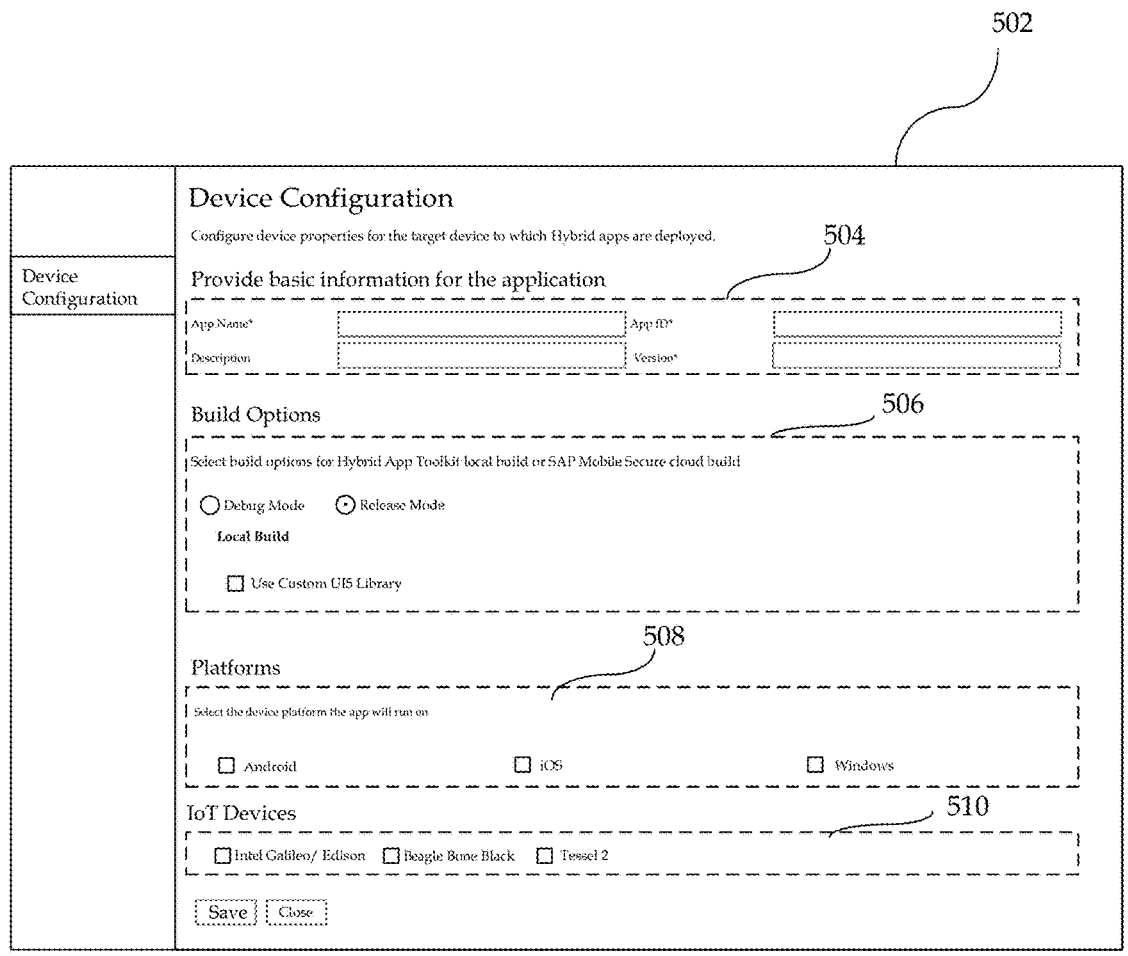
FIG. 5 shows a screenshot of an exemplary workspace for entering configuration data.

At 306, IDE 120 receives configuration data for the applications (or services). IDE 120 may be configured to present a workspace where the user (e.g., a developer) may enter configuration data associated with the target IoT device. FIG. 5 shows a screenshot of an exemplary workspace 502 for entering configuration data associated with a target device. The user may provide information via the workspace 502 to configure the properties of the target device to which the service or application is deployed. For instance, the user may provide configuration data including properties 504 (e.g., name. identifier, description, version) of the service or application to be deployed, build options 506 (e.g., hybrid App local build or cloud build), target platforms 508 (e.g., Android™, iOS, Windows™) on which the service or application will run, and one or more types of target IoT devices 510 (e.g., Intel™ Galileo/Edison, Beagle Bone Black, Tessel™ 2).

Figure 6:
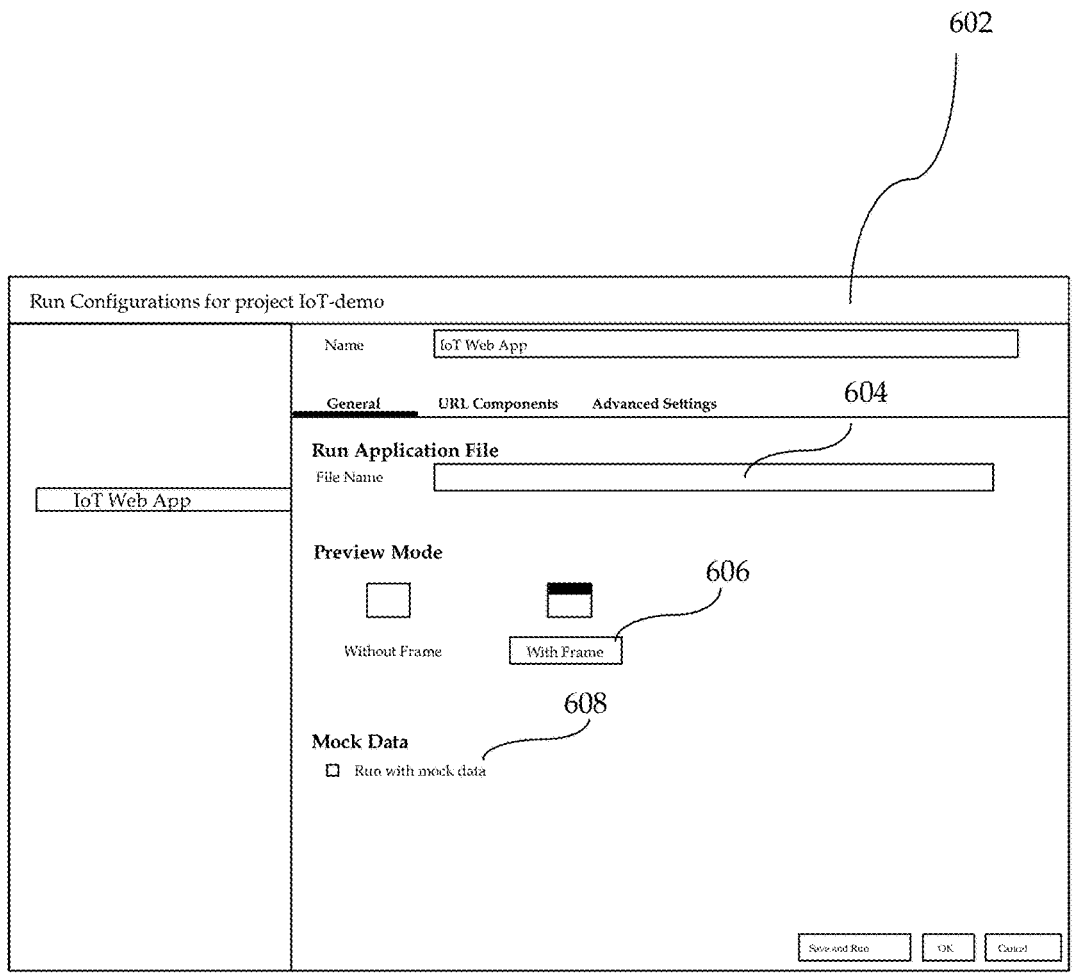
FIG. 6 shows a screenshot of an exemplary workspace for entering configuration data associated with an IoT Web App.

IDE 120 may also be configured to present a workspace where the user (e.g., a developer) may enter configuration data associated with the service or application. FIG. 6 shows a screenshot of an exemplary workspace 602 for entering configuration data associated with an IoT Web App. For example, the user may configure the run application file name 604, preview mode 606 and whether to run with mock data 608.

Returning to FIG. 3, at 308, IDE 120 deploys the applications (or services) to the multiple targets substantially and simultaneously, in response to receiving a single user input. The user input may be in the form of one click or tap of a user interface element (e.g., button or icon) received via the workspace provided by the IDE 120. For deployment of the applications, services and configuration data in a single action, the source code in the workspace may be combined with the project metadata, and the applications (or services) and IoT devices may be configured accordingly.

Based on the defined targets, the services or applications may be packaged and deployed, and configuration settings may be passed to the targets. In some implementations, the target is a mobile device 152a-b. IDE 120 may compile the configuration data and source code to build an IoT mobile App 206 or a packaged IoT mobile App 208. Build options and customization may be derived from the project metadata. IDE 120 may use the Hybrid Application Toolkit 124 to build a hybrid App at the system 106. The Hybrid Application Toolkit 124 may use the Web application as input and trigger the building of a mobile hybrid application. Alternatively, the source code and configuration data may be sent directly from the IDE 120 to the target. In some implementations, a build service is provided by the cloud platform 140 to package the service or application and make it available for download and distribution to the mobile devices 152a-b via a marketplace (e.g., SAP Mobile Place).

In some implementations, the target is a front-end server, a cloud platform 140, a database 142, mobile device 152a-b and/or an IoT device (or gateway) 210a-c. IDE 120 may interface with the various services available on such targets over, for example, REST APIs, to configure the services for the IoT project using the source code and configuration data.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system, comprising:
    a non-transitory memory device for storing computer-readable program code; and
    a processor in communication with the memory device, the processor being operated with the computer-readable program code to perform operations including:
        retrieving project metadata and at least one predefined project template, the project metadata defining a configuration of an Internet of Things (IoT) project, the project comprising a plurality of subprojects;
        processing the project metadata to extract information, proving an integrated development environment (IDE) via a Web browser,
        generating, via the IDE, source code for different IoT applications based on the information extracted from the project metadata and the project template,
        receiving configuration data associated with the IoT applications and multiple IoT targets, wherein the multiple IoT targets comprise at least one cloud platform, at least one mobile device and at least one IoT device, and
        configuring and deploying, in response to a single user input received via the IDE, the IoT applications to the multiple IoT targets simultaneously and based on the configuration data and the information extracted from the project metadata;
    wherein the IoT applications comprise an embedded IoT application, a Web application and a mobile application and the IDE combines code for each of the embedded IoT application, the Web application and the mobile application into a single project, and
    wherein the operations further include communicating, via a hybrid application toolkit in the IDE, with a companion application on the mobile device that provides acess to native mobile application programming interfaces (APIs) in the mobile device by running the mobile application within the companion application.

2. The system of claim 1 wherein the multiple IoT targets further is a front-end server, a database, an IoT gateway, or a combination thereof.

3. The system of claim 1 wherein the IoT applications comprise a mobile application and the processor is operated with the computer-readable program code to deploy the mobile application to the mobile device.

4. The system of claim 3 wherein the mobile application comprises a hybrid application.

5. The system of claim 1 wherein the IoT applications comprise an IoT service and the processor is operated with the computer-readable program code to deploy the IoT service to an in-memory database.

6. The system of claim 1 wherein the processor is operated with the computer-readable program code to deploy the embedded IoT application to the IoT device.

7. The system of claim 1, wherein the IDE provides, via a single input from a user via a graphical user interface, deployment of IoT device code to each of one or more IoT devices, computer system side logic to services, configuration data to an IoT cloud platform, and corresponding Web/mobile applications at the same time.

8. A method of developing Internet of Things (IoT) applications, the method being implemented by one or more data processors forming part of at least one computing device and comprising:
    retrieving project metadata and at least one predefined project template;

processing the project metadata to extract information, the project metadata defining a configuration of an Internet of Things (IoT) project, the project comprising a plurality of subprojects;

generating, via an integrated development environment (IDE), source code for different Internet of Things (IoT) applications based on the information extracted from the project metadata and the project template;

receiving configuration data associated with the IoT applications and associated IoT targets, wherein the IoT targets comprise at least one cloud platform, at least one mobile device and at least one IoT device; and configuring and deploying, in response to a single user input received via the IDE the IoT applications to the IoT targets simultaneously and based on the configuration data and the information extracted from the project metadata, wherein the IoT applications comprise an embedded IoT application, a Web application and a mobile application and the IDE combines code for each of the embedded IoT application, the Web application and the mobile application into a single project, and wherein the method further includes communicating, via a hybrid application toolkit in the IDE, with a companion application on the mobile device that provides access to native mobile application programming interfaces (APIs) in the mobile device by running the mobile application within the companion application.

9. The method of claim 8 further comprises providing the IDE via a Web browser.

10. The method of claim 8 further comprises presenting a workspace of the IDE that allows a user to select and customize the predefined project template.

11. The method of claim 8 wherein generating the source code comprises creating the Web application for the cloud platform.

12. The method of claim 8 wherein generating the source code comprises creating source code for an IoT data service that handles data processing on a database.

13. The method of claim 8 wherein generating the source code is generating source code for an IoT mobile application, packaged IoT mobile application, embedded IoT application or a combination thereof.

14. The method of claim 8 wherein receiving the configuration data comprises presenting a workspace that enables a user to enter the configuration data.

15. The method of claim 8 wherein the configuration data is information of the IoT applications, build options, target platforms, the IoT targets or a combination thereof.

16. The method of claim 8 wherein deploying the IoT applications to the IoT targets comprises compiling the source code of the IoT applications and the configuration data to build the IoT applications.

17. The method of claim 8 wherein deploying the IoT applications to the IoT targets is deploying the IoT applications to at least one front-end server, at least one cloud platform, at least one database, at least one mobile device, at least one IoT device, or a combination thereof.

18. The method of claim 8 wherein deploying the IoT applications to the IoT targets comprises sending the configuration data and source code of at least one of the IoT applications to the cloud platform for building the IoT applications.

19. A non-transitory computer-readable medium having stored thereon program code, the program code configured by a computer to perform operations comprising:

retrieving project metadata and at least one predefined project template;

processing the project metadata to extract information, the project metadata defining a configuration of an Internet of Things (IoT) project, the project comprising a plurality of subprojects;

generating, via an integrated development environment (IDE), source code for different Internet of Things (IoT) applications based on the information extracted from the project metadata and the project template;

receiving configuration data associated with the IoT applications and associated IoT targets wherein the IoT targets comprise at least one cloud platform, at least one mobile device and at least one IoT device; and configuring and deploying, in response to a single user input received via the IDE, the IoT applications to the IoT targets simultaneously and based on the configuration data and on the information extracted from the project metadata;

wherein the IoT applications comprise an embedded IoT application, a Web application and a mobile application and the IDE combines code for each of the embedded IoT application, the Web application and the mobile application into a single project, and wherein the operations further include communicating, via a hybrid application toolkit in the IDE, with a companion application on the mobile device that provides access to native mobile application programming interfaces (APIs) in the mobile device by running the mobile application within the companion application.

* * * * *